US011775390B2

(12) United States Patent
Eldefrawy et al.

(10) Patent No.: US 11,775,390 B2
(45) Date of Patent: Oct. 3, 2023

(54) CHECKPOINTABLE SECURE MULTI-PARTY COMPUTATION

(71) Applicant: SRI International, Menlo Park, CA (US)

(72) Inventors: Karim Eldefrawy, Palo Alto, CA (US); Benjamin Terner, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 51 days.

(21) Appl. No.: 17/451,617

(22) Filed: Oct. 20, 2021

(65) Prior Publication Data

US 2022/0121521 A1   Apr. 21, 2022

Related U.S. Application Data

(60) Provisional application No. 63/094,128, filed on Oct. 20, 2020.

(51) Int. Cl.
*G06F 11/14*   (2006.01)
(52) U.S. Cl.
CPC ...... *G06F 11/1407* (2013.01); *G06F 11/1438* (2013.01); *H04L 2209/46* (2013.01)
(58) Field of Classification Search
CPC .. G06F 11/1407; G06F 11/1438; H04L 9/085; H04L 2209/46
See application file for complete search history.

(56) References Cited

U.S. PATENT DOCUMENTS 9,317,326 B2 *   4/2016   Ramanathan ....... G06F 9/45558

OTHER PUBLICATIONS

"Compute Engine pricing," accessed on Apr. 27, 2021 from https://cloud.google.com/compute/all-pricing#machinetype, 11 pp.
"Klein, a Web Micro-Framework," accessed on Apr. 27, 2021 from klein.readthedocs.io/en/latest/index.html, 1 pp.
"Scale-Mamba Software," accessed on Apr. 27, 2021 from https://homes.esat.kuleuven.be/~nsmart/SCALE/, 5 pp.
"Spot Instance advisor," accessed on Apr. 27, 2021 from https://aws.amazon.com/ec2/spot/instance-advisor/, 2 pp.
"twisted.protocls.amp," accessed on Apr. 27, 2021 from twistedmatrix.com/documents/current/api/twisted.protocols.amp.html, 4 pp.

(Continued)

*Primary Examiner* — Joseph R Kudirka
(74) *Attorney, Agent, or Firm* — Shumaker & Sieffert, P.A.

(57) ABSTRACT

A multiparty computing system includes at least a first compute node and a second compute node, each of the first compute node and the second compute node each configured to execute a multiparty computation. The first compute node is configured to perform first operations of the multiparty computation over a share of first secret data and a share of second secret data; detect a checkpoint event; and, in response to detection of the checkpoint event, save a state of the multiparty computation on the first compute node to a checkpoint storage. In response to detection of a resume event, the first compute node executes a resume protocol with the second compute node, where the resume protocol includes exchanging messages with the second compute node, and determining, based on the messages, an operation in the multiparty computation to be the starting point to resume the multiparty computation.

20 Claims, 6 Drawing Sheets

(56) References Cited

OTHER PUBLICATIONS

Ben-Or et al., "Completeness Theorems for Non-Cryptographic Fault-Tolerant Distributed Computation (Extended Abstract)," ACM, Proceedings of the 20th Annual ACM Symposium on Theory of Computing, Chicago, Illinois, USA, May 2-4, 1988, 10 pp.
Bogetoft et al., "Secure Multiparty Computation Goes Live," Financial Cryptography and Data Security, 13th International Conference, FC 2009, Accra Beach, Barbados, Feb. 23-26, 2009, 13 pp.
Ion et al., "On Deploying Secure Computing: Private Intersection-Sum-with-Cardinality," 2020 IEEE European Symposium on Security and Privacy (EuroS&P), Genoa, Italy, Sep. 7-11, 2020, 25 pp.
Keller, "MP-SPDZ: A Versatile Framework for Multi-Party Computation," CCS '20: Proceedings of the 2020 ACM SIGSAC Conference on Computer and Communications Security, Oct. 2020, 30 pp.
Shamir et al., "How to share a secret," Communications of the Association for Computing Machinery, vol. 22, Issue 11, Nov. 1979, 9 pp.
Zahur et al., "Obliv-C: A Language for Extensible Data-Oblivious Computation," IACR Cryptol. Report: Nov. 27, 2015, 2015, 20 pp.

* cited by examiner

CHECKPOINTABLE SECURE MULTI-PARTY COMPUTATION

CROSS REFERENCE

This application claims the priority benefit of U.S. Provisional Patent Application No. 63/094,128, filed on Oct. 20, 2020, the entire content of which is hereby incorporated by reference.

TECHNICAL FIELD

This disclosure is related to computing systems, and more specifically to secure multi-party computing systems.

BACKGROUND

There are many application scenarios in which multiple parties with private data wish to compute a function over their joint data, but none of the parties wishes to reveal its own data or inputs to any other party. For example, multiparty computation (MPC) systems have been used for enforcing fairness of auctions and to privately measure ad attribution, among other examples.

Some multiparty computation systems allow parties to encrypt their inputs to such a computation and then compute over the encryption. Such systems can be referred to as secure multiparty computation (SMPC). For example, consider three parties, Alice, Bob, and Charles, who want to know who among them has the greatest net worth, but do not want to disclose their assets. A secure multiparty computation can be used to determine which of the three has the greatest net worth without any party discovering the assets of another party. Alice, Bob, and Charlie can each supply encrypted shares of the asset data to a secure multiparty computing system. The secure multiparty computing system can determine, from the encrypted shares, which party has the greatest net worth, and can report the results to Alice, Bob, and/or Charlie. However, the need to keep the parties' data private can result in secure multiparty computation being far more expensive than other forms of computing. For example, the parties must encrypt their data and the computing systems must compute over the encryptions.

SUMMARY

In general, the disclosure describes techniques for checkpointing multiparty computations. The techniques described herein can, in some examples, include saving the state of a local compute node's multiparty computation at various checkpoints during a multiparty computation. The multiparty computation can be resumed from the saved state. For example, if a compute node crashes or the multiparty computation on the compute node fails, the node can be restarted. Upon restart, the compute node can initiate a resume protocol with other compute nodes performing the multiparty computation. The resume protocol can include a negotiation between the compute nodes as to a step or index in the multiparty computation that is to be the starting point of the resumed multiparty computation. The compute nodes can restore the state of the multiparty computation from a previous checkpoint state. Similarly, a compute node that detects that another compute node's multiparty computation has failed prior to producing a result can initiate a resume protocol with the other compute node.

As an example, consider a scenario in which several hospitals seek to compare the effectiveness of treatments for a new disease. Each hospital records the health statuses of their own patients and monitors their responses to treatment. However, due to privacy laws, hospitals may not share information about their patients with each other. Using secure multiparty computation (MPC), two or more hospitals can compute aggregate statistics of the effectiveness of disease treatments while revealing no information about their individual patients, thereby extracting useful information while maintaining privacy.

Performing secure multiparty computations in practice over large data sets typically requires running powerful machines for long periods of time. Some MPC systems can tolerate a failure of one or more computing machines and still produce output. However, there can be constraints on the proportion of machines in a particular execution of an MPC that may fail before the remainder of machines will fail to produce output. Moreover, an MPC must typically be run continuously from the time that parties begin interaction until they produce output. As a result, costs of running a multiparty computation can be prohibitive. However, in cases where the results of a computation are not urgent, and/or the researchers are willing to wait an extended time for the result, the techniques described herein may be used to lease lower-cost "spare cycles" on machines, for example, machines of cloud service providers, over the course of several days, checkpointing in the case that the cloud provider reclaims the machines for other purposes, and resuming the computation when machines are re-provisioned. The techniques may be used by the parties (such as the hospitals in the example above) to complete the multiparty computation for a fraction of the cost of existing systems that do not provide for checkpointing.

The techniques described herein provide one or more technical advantages over existing systems. For example and as noted above, secure multiparty computations typically execute over long periods of time and can consume large amounts of computing resources. In existing systems, failure of a compute node to complete its part of a multiparty computation can result in the failure of the multiparty computation as a whole, thereby wasting resources expended on the failed computation. The techniques described herein can be provide a practical application of a compute node of a multiparty computation system checkpointing (e.g., saving the state of) a multiparty computation when a checkpoint event is detected. A checkpoint event can be a step in a computation protocol, a notification or indication of an imminent failure of any of the compute nodes, and/or a checkpoint request, for example. As a result, the techniques disclosed herein can improve the robustness and fault tolerance of multiparty computation systems.

Alternatively or additionally, the techniques described herein can increase the robustness of a multiparty computation with respect to dynamic attacks on the compute nodes performing the multiparty computation. Many common security models involve a multiparty computation in which some proportion of the active participants may be corrupted during the computation. If a threshold number of corrupted parties is not exceeded, then the uncorrupted parties can successfully complete the computation. However, if an attack happens that causes the number of corrupted parties to exceed the threshold in the middle of the multiparty computation, then the computation fails. Using the techniques described herein, in response to such an attack, the compute nodes can resume the multiparty computation from a checkpoint prior to the point that the threshold number of corruptions of compute nodes was surpassed, which may allow the multiparty computation to succeed despite the attack.

Alternatively or additionally, the techniques described herein can facilitate multiparty computations in more computing environments than for current multiparty computations. For example, the multiparty computation techniques described herein may be more tolerant of network and/or computing system failures than current multiparty computation techniques. As a result, the number of environments that can successfully perform multiparty computations may be increased to include environments that may be more likely to experience intermittent failure.

Alternatively or additionally, the techniques disclosed herein can reduce the costs associated with performing a multiparty computation. As noted above, secure multiparty computation may be executed using spare cycles of machines, and checkpointed when the machines are reclaimed by the provider. Spare cycles of machines may be available at a fraction of the cost of using dedicated machines. The multiparty computation can be resumed when spare cycles are once again available and reprovisioned for the multiparty computation. Further, multiparty computation systems may be executed on compute nodes where the cost of using the compute resources can vary over time. For example, compute resource costs may be based on time of day or based on demand for such resources. Computing costs may be low when demand for the compute resources is low, and increase when demand increases. The techniques disclosed herein can be used to perform the multiparty computation when computing costs are low, and checkpoint and pause the multiparty computation when computing costs rise. The multiparty computation can be resumed from the checkpoint when the computing costs drop to an acceptable level.

In some examples, a method includes receiving, by a first computing system having one or more processors, a share of first secret data and a share of second secret data; performing, by the first computing system, first operations of a multiparty computation over the share of first secret data and the share of second secret data, the multiparty computation comprising a multiparty computation protocol; detecting, by the first computing system, a checkpoint event; in response to detecting the checkpoint event, saving a state of the multiparty computation on the computing system to a checkpoint storage; detecting, by the first computing system, a resume event; in response to detecting the resume event, executing a resume protocol with a second computing system of the multiparty computation, the resume protocol comprising instructions to exchange one or more messages with the second compute node, and determine, based on the one or more messages, an operation in the multiparty computation to be the starting point to resume the multiparty computation; and performing, by the first computing system using the state of the multiparty computation saved to the checkpoint storage, second operations of the multiparty computation to complete the multiparty computation, the second operations beginning with the determined operation.

In some examples, a first compute node includes one or more processors; and a memory coupled to the one or more processors and storing instructions, that when executed, cause the one or more processors to: receive a share of first secret data and a share of second secret data; perform first operations of a multiparty computation over the share of first secret data and the share of second secret data, the multiparty computation comprising a multiparty computation protocol; detect a checkpoint event; in response to detection of the checkpoint event, save a state of the multiparty computation on the first compute node to a checkpoint storage; detect a resume event; in response to detection of the resume event, execute a resume protocol with a second compute node of the multiparty computation, the resume protocol comprising instructions to exchange one or more messages with the second compute node, and determine, based on the one or more messages, an operation in the multiparty computation to be the starting point to resume the multiparty computation; and perform, using the state of the multiparty computation saved to the checkpoint storage, second operations of the multiparty computation to complete the multiparty computation, the second operations beginning with the determined operation.

In some examples, a system includes a first compute node and a second compute node, each of the first compute node and the second compute node comprising processing circuitry configured to execute a multiparty computation, wherein the multiparty computation comprises a multiparty computation protocol; a network communicatively coupling the first compute node and the second compute node; wherein the first compute node is configured to: receive a share of first secret data and a share of second secret data; perform first operations of the multiparty computation over the share of first secret data and the share of second secret data; detect a checkpoint event; in response to detection of the checkpoint event, save a state of the multiparty computation on the first compute node to a checkpoint storage; detect a resume event; in response to detection of the resume event, execute a resume protocol with the second compute node, the resume protocol comprising instruction to exchange one or more messages with the second compute node, and determine, based on the one or more messages, an operation in the multiparty computation to be the starting point to resume the multiparty computation; and perform, using the state of the multiparty computation saved to the checkpoint storage, second operations of the multiparty computation to complete the multiparty computation, the second operations beginning with the determined operation.

The details of one or more examples of the techniques of this disclosure are set forth in the accompanying drawings and the description below. Other features, objects, and advantages of the technique will be apparent from the description and drawings, and from the claims.

DETAILED DESCRIPTION

Figure 1:
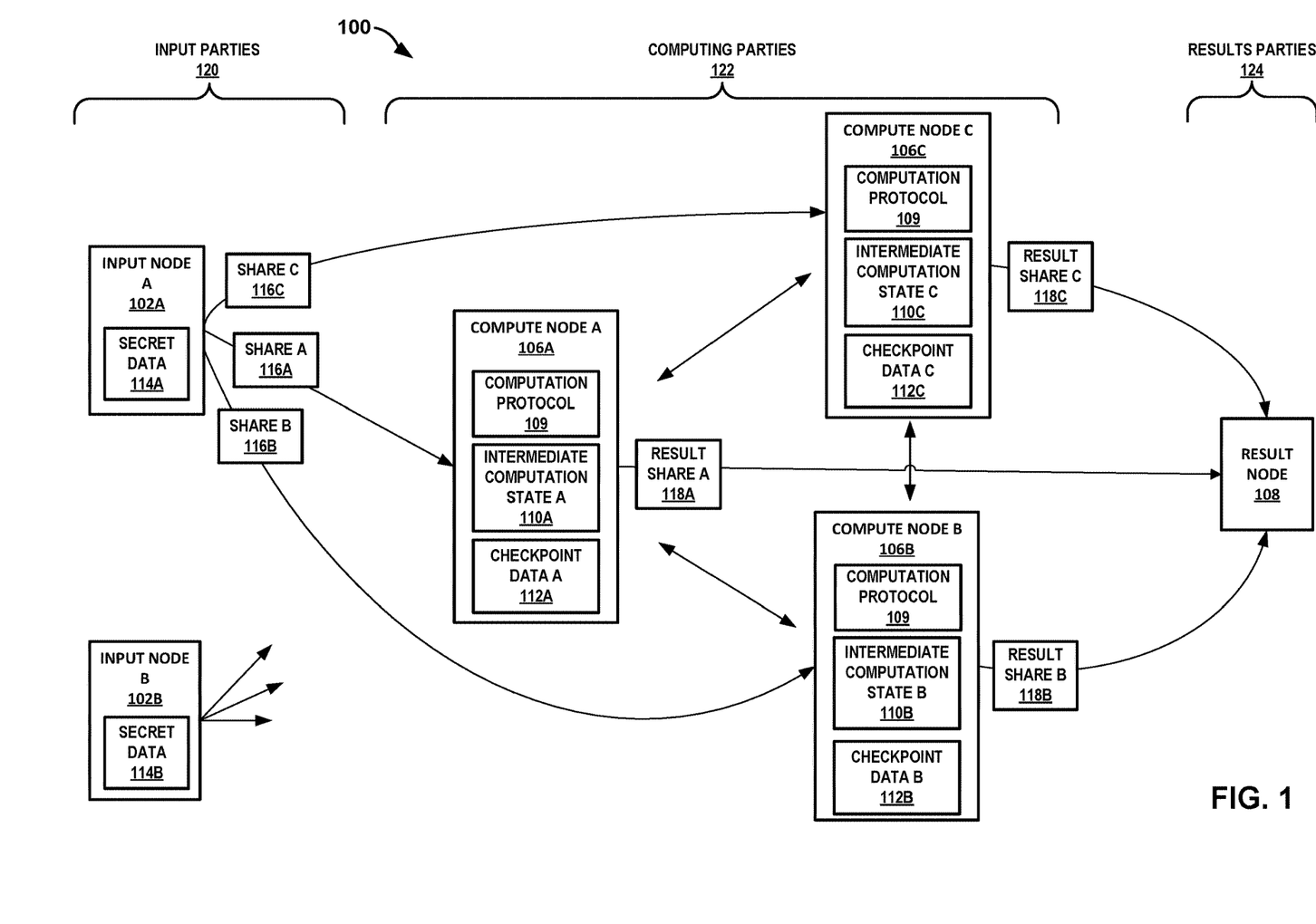
FIG. 1 illustrates an example secure multiparty computation system that facilitates checkpointing an intermediate state of a computation, in accordance with techniques of the disclosure.

FIG. 1 illustrates an example SMPC system 100 that facilitates checkpointing an intermediate state of a computation, according to techniques described herein. SMPC system 100 may be implemented for a variety of different applications. As one example, SMPC system 100 can be implemented as part of a system where, as described above, hospitals desire to compute aggregate statistics for health care results in response to treatments. Due to privacy laws, hospitals may not share information about their patients with each other. Using secure multiparty computation (MPC), two or more hospitals can compute aggregate statistics of the effectiveness of treatment options while revealing no information about their individual patients, thereby extracting useful information while maintaining privacy. Such applications may take a relatively long time to complete (e.g., several days), and thus may be more likely to suffer from computing system shutdowns or failures. The techniques described herein can checkpoint the computations at various points in time and can resume computations from the most recent checkpoint, thereby avoiding having to restart from the very beginning of the computation.

As another example, system 100 can be implemented as part of a machine learning system designed to train large data sets that may be provided by multiple parties. Each party may wish to obtain the benefits of machine learning based on a large set of training data from multiple parties, but each party may desire to keep their own training data private from the other parties. Machine learning over large data sets using secure multiparty computation techniques can take relatively long periods of time, which, as with the hospital example, can make the machine learning more likely to fail in the event of a shutdown or failure of one or more computing systems performing the secure multiparty computation. Using the techniques described herein, the machine learning using secure multiparty computation can be resumed from a recent checkpoint, thereby avoiding the need to restart the machine learning process from the beginning.

As a further example, SMPC system 100 may be implemented as part of a biometric authentication system. It is desirable to keep biometric data private, and further, it is desirable to store portions of biometric data in different storage system to reduce the possibility of a malicious party being able to reconstruct the biometric data of a user. During an enrolment with an authentication system, biometric data may be processed using secure multiparty computation. Such processing can take a relatively long period of time. A failure of a system during the enrolment process can result in a user having to resubmit a biometric sample, which can be inconvenient for the user. Using the techniques described herein, the enrolment processing can be made more robust by resuming a secure multiparty computation from a recent checkpoint in the event of a shutdown or failure of a computing system during the enrolment processing.

An SMPC system 100 typically includes input parties 120, computing parties 122, and results parties 124. In general, input parties 120 provide shares of encrypted data (e.g., secret data) as input to computing parties 122. Computing parties receive the encrypted data, and perform a secure multiparty computation over the data. In some aspects, the encrypted data is not decrypted during the secure multiparty computation. Computing parties 122 each provide result shares to results parties 124. When combined, the results shares are the final result of the secure multiparty computation. Together, input parties 120, computing parties 122 and results parties 124 form an MPC network.

In the example shown in FIG. 1, input parties 120 includes input node 102A and input node 102B. Input node 102A and input node 102B represent computing devices that respectively store, at least temporarily, secret data 114A and secret data 114B. Secret data 114A and secret data 114 B is input data to be provided to a secure multiparty computation.

Figure 3A:
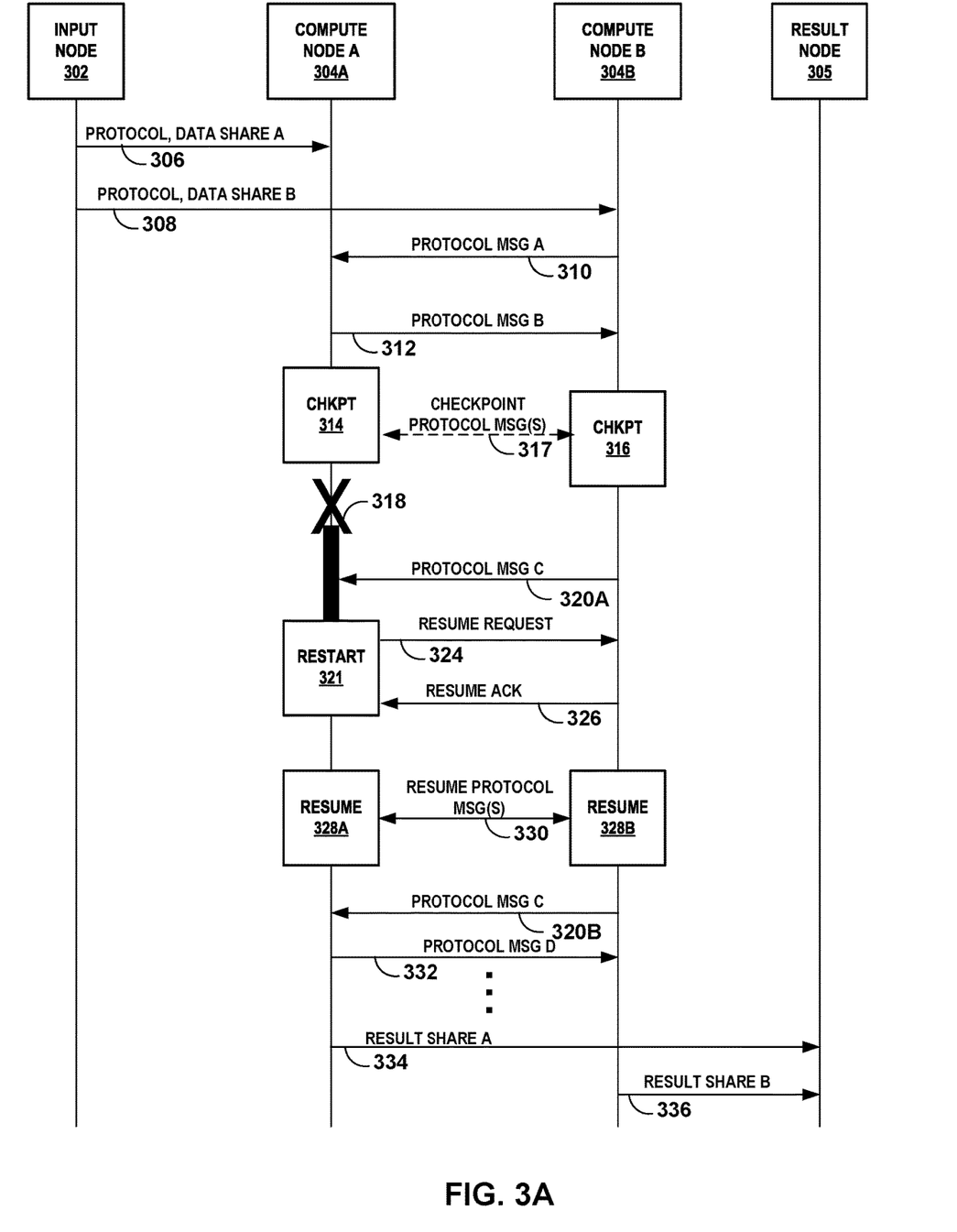
FIGS. 3A-3C are sequence diagrams illustrating a checkpointing in a secure multiparty computation, in accordance with techniques of the disclosure.

In the example illustrated in FIG. 1, computing parties 122 include compute node 106A, compute node 106B, and compute node 106C, collectively referred to as "compute nodes 106." Each compute node 106 may be associated with different parties from one another, including different input parties and/or different results parties. For example, compute node 106A may be a server owned by a first party, compute node 106B may be computing resources provided by a cloud service provider and leased by a second party, and compute node C may be a bare metal service in a data center that is leased by a third party. Each compute node 106 is configured to perform at least one compute function 108 over shares of secret data received from input parties 120. In the example illustrated in FIG. 3, input node 102A provides shares of secret data 104A to compute nodes 106A-106C. For example, share 116A of secret data 104A is provided to compute node 106A. Share 116B of secret data 104A is provided to compute node 106B. Share C 116C of secret data 104A is provided to compute node 106C. Input node 102B similarly provides shares of secret data 114B to compute nodes 106A-106C.

Each compute node 106A-106C implements at least one computation protocol 109 that performs a computation over its corresponding shares of data received from input nodes 102A and 102B. In some aspects, computation protocol 109 can be one of the protocols listed in Table 1.

TABLE 1

| Protocol | Description |
| --- | --- |
| ShareProtocol | One party shares a single input |
| ShareNProtocol | One party shares a vector of inputs |
| ReconstructProtocol | Reconstruct a single value |
| ReconstructNProtocol | Reconstruct a vector of values |
| MultProtocol | Multiply two secret-shared values |
| HadamardProtocol | Pairwise multiplication of two vectors of secret-shared values |
| SumProtocol | Sum data provided by all parties |
| StDev Protocol | Standard deviation of data provided by all parties |
| SFE Linear Protocol | Linear Transformation over vector of secrets |
| SFE N Linear Protocol | Linear Transformation over n vectors of secrets |

The above listed protocols are examples; many other functions may be implemented as secure multiparty protocols, and many combinations of protocols may implement a secure multiparty computation.

Each of compute nodes 106A-106C creates and maintains a corresponding intermediate computation state 110A-110C as the compute node performs the computation implemented by computation protocol 109 over its corresponding shares of secret data provided by input parties 120. The intermediate state may include the shares of secret data received as input, an index, step counter, or other identifier of a current step of the computation, register values, temporary values, or other intermediate values, copies of messages received from other compute nodes, digests thereof, etc. As an example, a message digest may be created by performing a function (e.g., a cryptographic function) over received messages (or portions thereof) that preserves the integrity of the message. Intermediate computation states 110A-110C change as respective compute nodes 106A-106C progress independently through the computation protocol steps.

A compute node 106 may periodically checkpoint the current state of its multiparty computation. For example, one of the steps of computation protocol 109 may be to direct the compute node 106 to checkpoint the current computation state. In this case, compute node 106 saves (e.g., copies) its current intermediate computation state 110 to checkpoint data 112. For example, compute node 106A may save (e.g., copy) its current intermediate computation state 110A to checkpoint data 112A.

In some aspects, each compute node 106 independently checkpoints their corresponding state of the multiparty computation. For example, a checkpoint instruction may be part of the multiparty computation protocol being performed by the parties that, when reached, causes the compute node 106 to verify the integrity of the results to the point of the checkpoint. In some aspects, a checkpoint is a subprotocol of the multiparty computation protocol. The checkpoint protocol can be an interactive protocol in which compute nodes exchange messages to verify the results of their corresponding computations up to a predetermined point. The compute nodes 106 may verify the integrity of their corresponding results using cryptographic checks. The checkpoint protocol can include checking the success or failure of the integrity verification. In some aspects, a checkpoint success or failure is unanimous. That is, the checkpoint is considered a success if each of compute nodes 106 successfully verifies the integrity of the multiparty computation. If any one or more compute nodes fail to verify the integrity of their portion of the multiparty computation, then the checkpoint is considered a failure for all of compute nodes 106. If the checkpoint is determined to be a success, each compute node 106 can save its corresponding intermediate computation state 110 to its checkpoint data 112A. In some aspects, the checkpoint protocol may set bounds on how far apart each compute node's point in the multiparty computation may vary from other compute nodes. For example, the multiparty computation protocol may include state machine replication to facilitate each node determining how far apart it is in the multiparty computation from other compute nodes with respect to the multiparty computation.

At a later point in the multiparty computation, if a compute node (e.g., compute node 106A) experiences a hardware or software failure and crashes, or the compute node is reclaimed by a service provider, the multiparty computation may be resumed on the compute node based on its corresponding copy of checkpoint data 112 when the compute node restarted or resumed. In some aspects, a resume protocol may be executed by the compute nodes participating in the multiparty computation when a compute nodes is restarted or resumed. During execution of the resume protocol, compute nodes 106 can exchange messages as part a negotiation to reach agreement between compute nodes 106 on a point (e.g., a step or operation) in the multiparty computation from which to resume the computation. The step or operation may be identified by an index or other identifier associated with steps or operations in the multiparty computation. Once agreement is reached, each compute node 106 restores its corresponding intermediate state 110 of computation from its checkpoint data 112 and resumes the computation from the agreed upon step or operation. If compute nodes 106 are not able to reach an agreement as to where to resume the multiparty computation, the computation may fail. In some aspects, the resume protocol does not require that all compute nodes agree on a point to resume the multiparty computation. For example, if a predetermined number or percentage of compute nodes 106 can agree on a point to resume, those compute nodes that reached agreement can resume the multiparty computation from the agreed upon point while the compute nodes 106 that did not agree can be suspended or terminated.

In some aspects, a checkpointable MPC protocol can specify how parties may crash before the computation is halted. In some aspects, the checkpointable MPC can specify that a multiparty computation is to be paused or suspended when compute nodes that have not crashed or otherwise failed detect that a threshold number of compute nodes have gone offline or failed. The compute nodes can utilize the resume protocol described above to resume the multiparty computation when a sufficient number of compute nodes become available.

Further details of checkpointing and resuming are provided below with respect to FIGS. 2-4.

In the example illustrated in FIG. 1, results parties 124 includes result node 106. Result node 106 receives result shares 118A-118C generated respectively by compute nodes 106A-106C. Result node 106 can reassemble the result shares 118A-118C to produce the final results of the secure multiparty computation.

Each of input nodes 102, compute nodes 106, and result node 108 may represent a computing device such as a real or virtual server, a bare metal server, a virtual machine, a containerized application, a computer process, and/or other execution element. Further, a node may be implemented on a table computer, smart phone, personal computer, server computer, laptop computer etc. Each of the nodes may be on premises or deployed to or by a private cloud or public cloud, for example, and the nodes are connected by one or more computer networks to enable communications. The nodes may be distributed across various computing systems and networks in a variety of ways. For example, in some aspects, the nodes may all reside on one or more cloud service provider systems. In some aspects, the nodes may all execute on a single computing device. In some aspects, the nodes may be distributed across multiple computing devices. In some aspects, the nodes may be distributed across a combination of computing devices and cloud service provider systems, with some of the nodes executing on the computing devices and some of the nodes executing on one or more cloud service provider systems.

The example illustrated in FIG. 1 shows two input parties, input node 102A and input node 102B. In some aspects, a greater number of input parties is possible. Further, the example illustrated in FIG. 1 shows three compute nodes 106A-106C. In some aspects, a system 100 can include a greater (or lesser) number of compute nodes. Additionally, the example illustrated in FIG. 1 shows a single result node 108. In some aspects, a system 100 can include more than one result node. Also, although input parties 120, compute parties 122, and results parties 124 are shown in FIG. 1 as separate entities, a node such as input node 102, compute node 106 or result node 108 can belong to more than one category. For example, a compute node 106 may be both an input node 102 and a result node 108.

Figure 2:
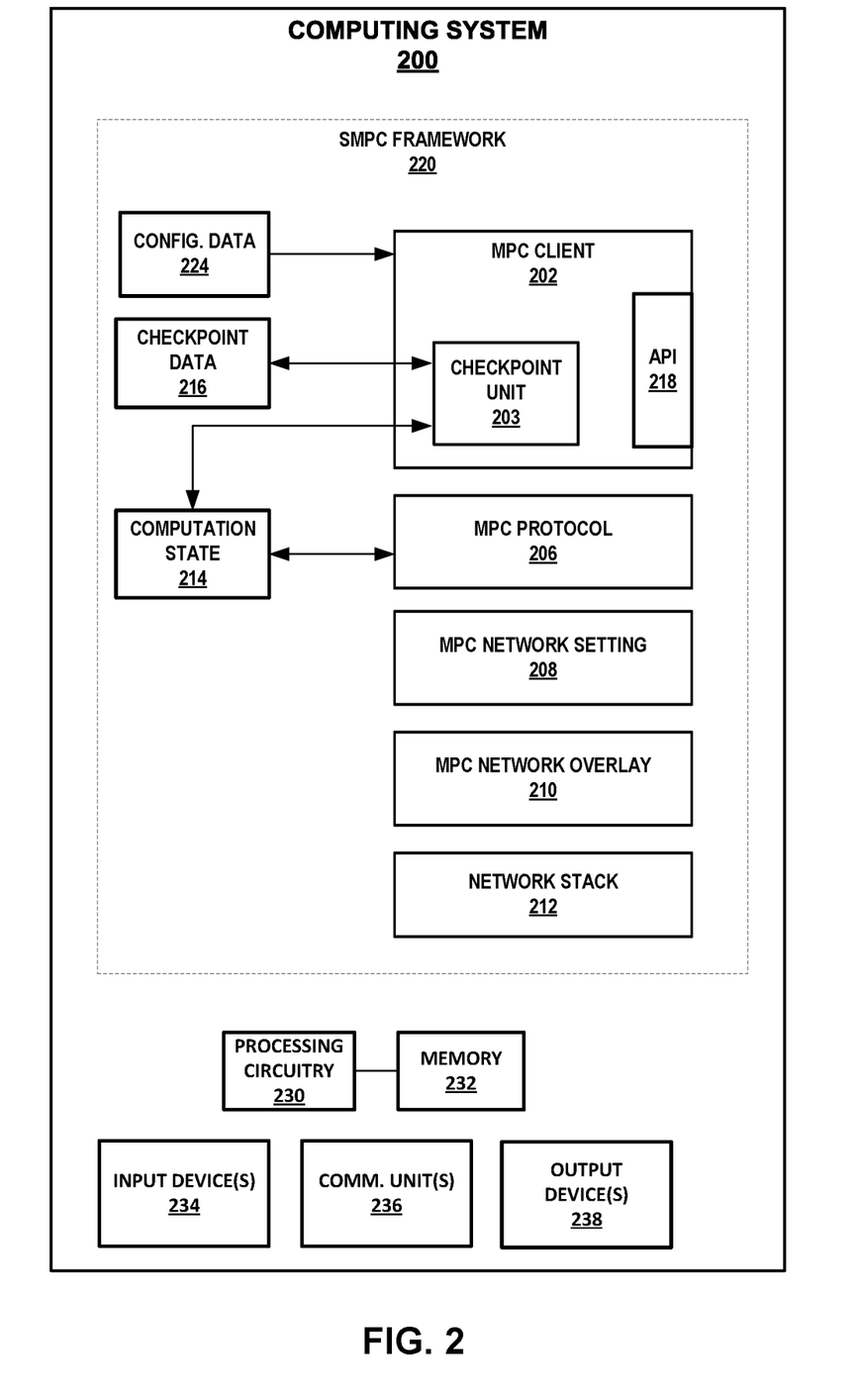
FIG. 2 is a block diagram illustrating a computing system for performing checkpointable secure multiparty computation, in accordance with techniques of the disclosure.

FIG. 2 is a block diagram illustrating a computing system for performing checkpointable secure multiparty computation, in accordance with techniques of the disclosure. Computing system 200 represents a computing device configured for performing checkpointable secure multiparty computation, and may represent any of compute nodes 106A-106C of FIG. 1. In some aspects, computing system 200 includes processing circuitry 230 and memory 232 that can execute components of SMPC framework 220. Such components may include MPC client 202, MPC protocol 206, MPC network setting 208, MPC network overlay 210 and network stack 212 that may form an overall SMPC framework 220 that can implement one or more techniques described herein to perform a checkpointable secure multiparty computation.

Although labeled as clients, in some aspects, a client may also be a server and a server may also be a client. In other words, client and server are symmetric (they respond identically to incoming messages). A "client" is a machine that initiates a connection, and "server" is a machine that responds to an initiation request to complete a connection. In some aspects, each computing party of an MPC network can execute the same software implementing SMPC framework 220 to perform a secure multiparty computation.

Configuration data 224 may specify various operational and startup parameters used by SMPC framework 220. In some aspects, configuration data 224 can specify one or more of the following parameters:

Id: the party's unique identification within the MPC network.

Host: The party's hostname (may be "localhost").

Port: specifies the port that the party listens on for communication with other parties in the MPC network.

Webport: specifies the port on which exposed web services listens for commands.

Parties: a list of objects identified by {id, host, port} and containing information for all parties in the MPC network, including self.

Mpc_parameters: includes num_parties specifying the total number of parties in the MPC network and a modulus specifying a prime modulus defining the field over which to perform arithmetic operations.

MPC client 202 can read configuration data 224 as part of an initialization process for SMPC framework 220. In some aspects, MPC client 202 implements functionality for one or more multiparty computation protocols. MPC client 202 may send and receive messages to and from other parties of the MPC network via API 218. MPC client 202 may expose an API 218. In some aspects, API 218 may be a representational state transfer (REST) API (also referred to as a RESTful API). API 218 may expose interfaces to start a secure multiparty computation, obtain results for the computation, checkpoint the computation, and resume the computation among others.

In some aspects, MPC client 202 can include checkpoint unit 203. Checkpoint unit 203 can store a current state of a secure multiparty computation being performed by MPC protocol 206. For example, checkpoint unit 203 may store a current copy of computation state 214 into checkpoint data 216. Computation state 214 represents the current state of the computation being performed by MPC protocol 206. This state may include the input shares of data, intermediate results of calculations of MPC protocol 206, and messages exchanged between computing system 200 and other parties to the secure multiparty computation. Checkpoint data 216 may also include some or all of the elements of configuration data 224 described above. In some aspects, checkpoint unit 203 may be invoked to save a current copy of computation state 214 in response to the occurrence of a checkpoint event. In some aspects, a checkpoint event can be an explicit step in MPC protocol 206 that instructs checkpoint unit 203 to save current computation state 214. In some aspects, a checkpoint event can be the receipt of a checkpoint request via API 218. The checkpoint request can come from other computing parties of the computation or from a control node (not shown in FIG. 2). In some aspects, the checkpoint event can be a request to shutdown computing system 200.

Although shown as residing on computing system 200, checkpoint data 216 may be stored remotely from computing system 200. For example, checkpoint data 200 may be stored on a cloud storage system or other network attached storage accessible to computing system 200. Checkpoint data 216 may also be stored on multiple local and/or remote storage systems that are private to the party operating computing system 200. For example, some portions of checkpoint data 216 may be stored in a first storage system, while other portions, for example, message data or message digests, may be stored on a different storage system. In some aspects, some or all of checkpoint data 216 may be encrypted using a private key of computing system 200 or a key received as part of the checkpoint request.

Checkpoint unit 203 can restore computation state 214 from checkpoint data 216. In this case, MPC protocol 206 is reset to its state at the point when computation state 214 was copied to checkpoint data 216. Any messages or intermediate computations received after checkpoint data 216 was created or modified may be lost and may be replayed when computation protocol resumes from the saved state. Checkpoint unit 203 may restore computation state 214 from checkpoint data 216 in response to the occurrence of a resume event. In some aspects, a resume event can be the receipt of a resume request via API 218. The resume request may come from other compute parties of the computation or from a control node. In some aspects, the resume event can be a restart of computing system 200, perhaps after failure of computing system 200 for a failure of a software component of computing system 200.

MPC protocol 206 implements a secure multiparty computation protocol. For example, MPC protocol 206 may implement one or more of the secure multiparty computation protocols described in Table 1 above. In some aspects, MPC protocol 206 may implement a protocol based on Shamir's secret sharing. An example of such a protocol is the BGW protocol. Details on the BGW protocol may be found in Michael Ben-Or, Shafi Goldwasser, and Avi Wigderson. 1988. *Completeness theorems for non-cryptographic fault tolerant distributed computation*. In Proceedings of the twentieth annual ACM symposium on Theory of computing (STOC '88), which is hereby incorporated by reference herein. The BGW protocol uses Shamir's t-out-of-n secret sharing scheme, where t is the tolerated corruption threshold (i.e., how many of the n parties performing the MPC are semi-honest and attempt to learn the data of other parties. Shamir's t-out-of-n secret sharing scheme may be found in Adi Shamir. 1979. *How to share a secret*. Communications of the Association for Computing Machinery 22, 11 (November 1979), 612-613, which is hereby incorporated by reference herein. Other examples of MPC protocol 206 include SCALEMAMBA, described at the URL "home-s.esat.kuleuven.be/~nsmart/SCALE/," MP-SPDZ, described in CCS '20: Proceedings of the 2020 ACM SIGSAC Conference on Computer and Communications Security, October 2020 Pages 1575-1590, and Obliv-C, described in Samee Zahur and David Evans. *Obliv-C: A Language for Extensible Data-Oblivious Computation*, Cryptology ePrint Archive: Report 2015:1153 November 2015, each of which are incorporated by reference herein.

MPC network setting 208 can be a network framework that handles network events and provides a framework for providing web services, for example, web services that may be provided by MPC client 202. In some aspects, MPC network setting 208 can be implemented using asynchronous message passing functionality provided by Twisted. Twisted is described at the URL "twistedmatrix.com/documents/current/api/twisted.protocols.amp.html". Web services functionality may be provided by Klein. Klein is described at the URL "klein.readthedocs.io/en/latest/index.html".

MPC network overlay 210 provides an abstraction of the underlying network stack 212 for use by other components of SMPC framework 220.

Network stack 212 comprises a communication protocol stack that may be provided by the operating system (not shown in FIG. 2) of computing system 200. As an example, the network stack may be a Transmission Control Protocol/Internet Protocol (TCP/IP) and/or User Datagram/IP (UDP/IP) protocol stack.

The functionality described above with respect to the various components of SMPC framework 220 (e.g., MPC client 202, MPC protocol 206, MPC network setting 208, MPC network overlay 210 and network stack 212) may be distributed in different ways than described above. In some implementations, functionality describe above as being performed by a component may be performed by a different component or an additional component not shown in FIG. 2. As example, MPC client 202 may include a custom MPC client and a base MPC client (not shown in FIG. 2). The custom MPC client may implement functionality that is specific to a particular MPC protocol, while the base MPC client may implement functionality that is common across different multiparty computations and default actions to be performed. For example, in some aspects the base MPC client may read configuration data and include functionality to checkpoint and resume an MPC computation.

One or more of the components of SMPC framework 220 described above may be executed by processing circuitry 230 from memory 232 operably coupled to processing circuitry 230. Memory 232 may store information for processing during operation of computing system 200. In some examples, memory 232 may include temporary memories, meaning that a primary purpose of the one or more storage devices is not long-term. Memory 232 may be configured for short-term storage of information as volatile memory and therefore not retain stored contents if deactivated. Examples of volatile memories include random access memories (RAM), dynamic random-access memories (DRAM), static random access memories (SRAM), and other forms of volatile memories known in the art. Memory 232, in some examples, also includes one or more computer-readable storage media. Memory 232 may be configured to store larger amounts of information than volatile memory. Memory 232 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 232 may store program instructions and/or data associated with one or more of the components described in accordance with one or more aspects of this disclosure.

Processing circuitry 230 and memory 232 may provide an operating environment or platform for computing system 200, which may be implemented as software, but may in some examples include any combination of hardware, firmware, and software. Processing circuitry 230 may execute instructions and memory 232 may store instructions and/or data of one or more components or modules. The combination of processing circuitry 230 and memory 232 may retrieve, store, and/or execute the instructions and/or data of one or more applications, components, modules, or software. Processing circuitry 230 and memory 232 may also be operably coupled to one or more other software and/or hardware components, including, but not limited to, one or more of the components illustrated in FIG. 2.

Computing system 200 may perform operations for some or all of the components of SMPC framework 220 described herein using software, hardware, firmware, or a mixture of hardware, software, and firmware residing in and/or executing at computing system 200. Computing system 200 may execute each of the component(s) with multiple processors or multiple devices. Computing system 200 may execute one or more of such components as part of a virtual machine or container executing on underlying hardware. One or more of such components may execute as one or more services of an operating system or computing platform. One or more of such components may execute as one or more executable programs at an application layer of a computing platform.

One or more input devices 234 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 238 of computing system 200 may generate, transmit, or process output. Examples of output are tactile, audio, visual, and/or video output. Output devices 238 may include a display, sound card, video graphics adapter card, speaker, presence-sensitive screen, one or more USB interfaces, video and/or audio output interfaces, or any other type of device capable of generating tactile, audio, video, or other output. Output devices 238 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 234 and one or more output devices 238.

One or more communication units 236 of computing system 200 may communicate with devices external to computing system 200 (or among separate computing devices of computing system 340) by transmitting and/or receiving data and may operate, in some respects, as both an input device and an output device. In some examples, communication units 236 may communicate with other devices over a network. In other examples, communication units 236 may send and/or receive radio signals on a radio network such as a cellular radio network. Examples of communication units 236 include a network interface card (e.g., such as an Ethernet card), an optical transceiver, a radio frequency transceiver, a GPS receiver, or any other type of device that can send and/or receive information. Other examples of communication units 236 may include Bluetooth®, GPS, 3G, 4G, and Wi-Fi® radios found in mobile devices as well as Universal Serial Bus (USB) controllers and the like.

Figure 3B:
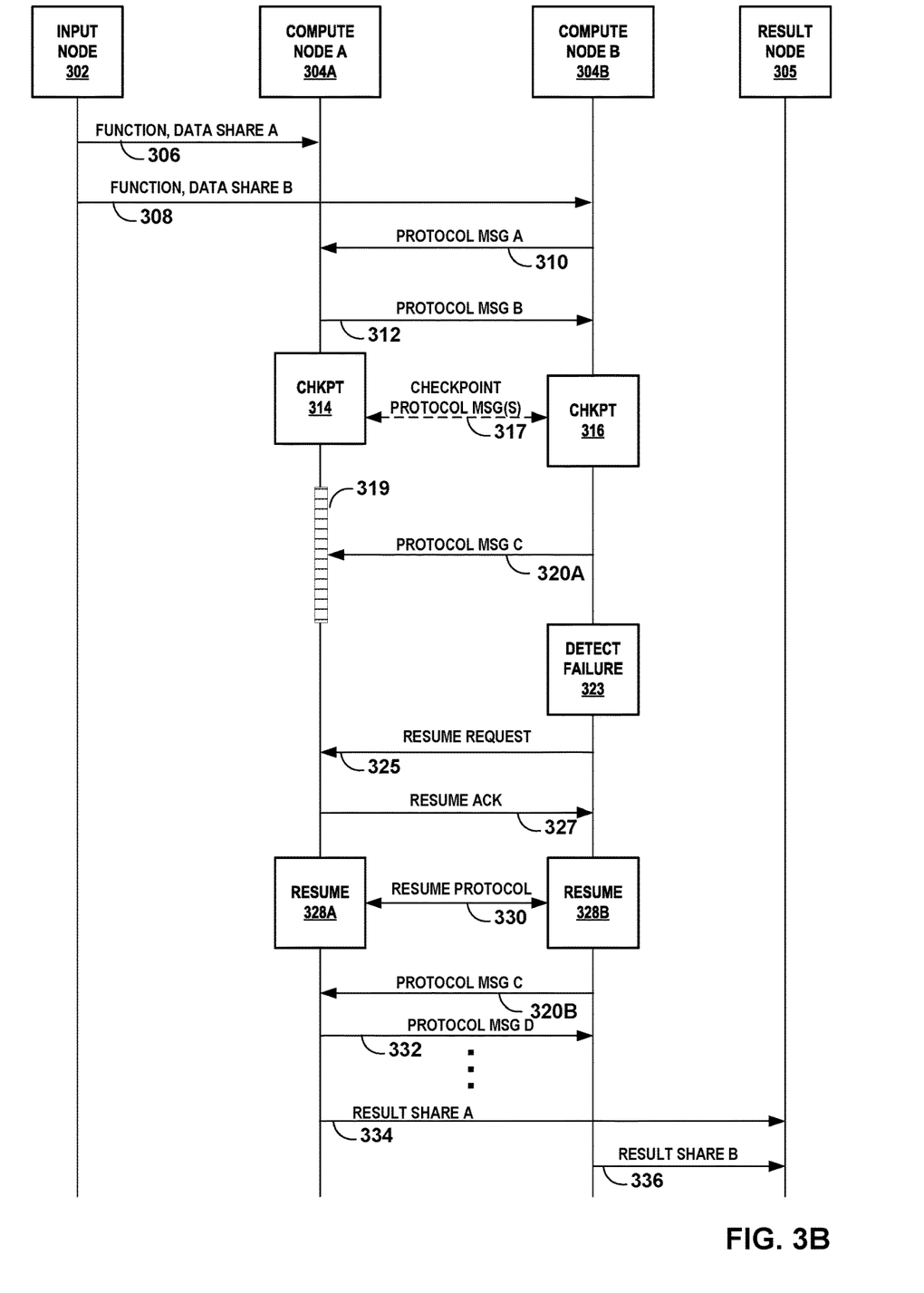
Figure 3C:
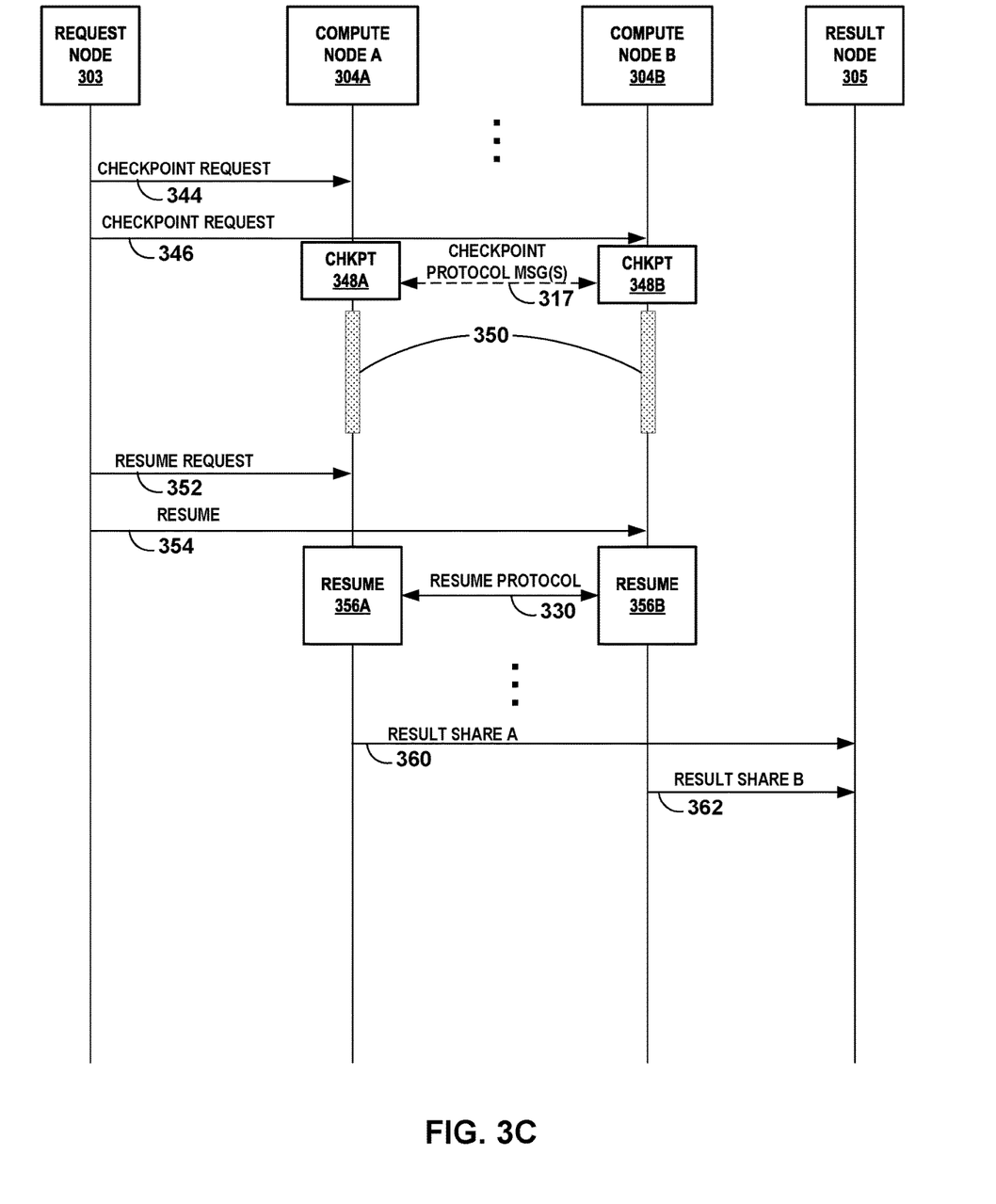

FIGS. 3A-3C are example sequence diagrams illustrating examples of checkpointing in a secure multiparty computation, in accordance with techniques of the disclosure. The example sequence diagrams illustrated in FIGS. 3A-3C are presented in the context of two compute nodes that interact with each other and other nodes in an MPC network. Additionally, FIGS. 3A-3C show a single input node 302 and a single result node 305. The configuration of nodes shown in FIGS. 3A-3C is used to avoid obfuscating the techniques illustrated in the example sequence diagrams. An MPC network may have more than one input node and may have more than one result node. Further, an MPC network may have more than two compute nodes and the techniques shown in the example sequence diagrams are readily extendable to MPC networks having more than two compute nodes.

FIG. 3A is an example sequence diagram illustrating an example of a checkpoint and a resume in the context of a failure of a compute node. The example illustrated in FIG. 3A is presented in the context of an MPC network that includes an input node 302, compute nodes 304A and 304B, and a result node 306. Compute nodes 304A and 304B may represent, for example, a compute node 106 of FIG. 1 and/or computing system 200 of FIG. 2.

The example sequence begins with input node 302 providing a request to begin a multiparty computation to compute node 304A (306). The request may include an identification of a multiparty computation protocol to be used (e.g., a protocol from Table 1), and a share of input data (data share A) for the computation. Similarly, input node 302 provides a request to begin a multiparty computation to compute node 304B (308). The request may include the identification of the protocol to be used and a different share of the input data.

In response to the request, compute node 304A and compute node 304B begin the secure multiparty computation requested by input node 302. As part of the secure multiparty computation, compute node 304A and compute node 304B exchange messages A (310) and B (312).

In the example illustrated in FIG. 3A, compute node 304A detects a checkpoint event. In response to the checkpoint event, compute node 304A saves a copy of compute node 304A's current computation state as checkpoint data (314). Similarly, compute node 304B independently from compute node 304A also detects a checkpoint event. In response to the checkpoint event, compute node B saves a copy of compute node 304B's current computation state as checkpoint data (316). As an example, compute node 304A and compute node 304B may perform their respective checkpoint operations in response to a checkpoint step in the computation protocol.

In some aspects, in response to a checkpoint event, compute node 340A and compute node 304B may execute checkpoint protocol 317. Checkpoint protocol 317 includes operations to verify the integrity of the multiparty computation on a corresponding compute node executing the checkpoint protocol (in the example illustrated in FIG. 3, compute nodes 304A and 304B). In some aspects, the integrity of the multiparty computation may be cryptographically verified. Checkpoint protocol 317 may further include communicating, between the compute nodes (e.g., compute nodes 304A and 304B) the results of the integrity verification. In some aspects, if each compute node successfully verifies the integrity of their corresponding multiparty computation, then the checkpoint is considered successful, and the compute nodes store their intermediate computation state to their corresponding checkpoint data. In some aspects, if any one compute node fails to successfully verify the integrity of their corresponding multiparty computation, the checkpoint is considered to have failed, and the intermediate computation state is not saved.

At some point in the multiparty computation after the checkpoint event detected by compute 304A, the node experiences a node failure such as a hardware error, software error, shutdown, deletion, or other failure such that the multiparty computation terminates early on compute node 304A or compute node 304A is otherwise unable to further participate in the multiparty computation due, e.g., to network failure (318). During the period where compute node 304A does not respond to protocol messages, compute node 304B sends a protocol message C (320A) that is not received by compute node 304A due to the failure of compute node 304A.

Compute node A begins a restart (321) to recover from the node failure. As part of the restart, compute node 304A issues a resume request to other compute parties in the MPC, in this example, compute node 304B (324). Compute node 304B may acknowledge the resume request (326). Compute node 304A and compute node B then begin a resume protocol, 328A and 328B respectively. As part of the resume protocol, compute node 304A restores the current computation state using compute node 304A's previously stored checkpoint data. Similarly, compute node 304B restores the current computation state using compute node 304B's previously stored checkpoint data. Compute node 304A and compute node 304B may exchange resume protocol messages 330 as part of restoring their respective computation states. The exchange of resume protocol messages 330 may be used by the compute nodes to reach agreement on a step in the protocol from which the compute nodes are to resume.

In the example illustrated in FIG. 3, because compute node 304B's computation state has been restored to a point in time prior to its sending protocol message C 320A, compute node 304B repeats sending protocol message C (320B).

Compute node 304A and compute node 304B can continue the secure multiparty computation until each respective compute nodes generates a share of the result. Compute node 304A sends its result share A to result node 305 (334). Compute node 304B also sends its result share B to result node 305 (336). Result node 305 can combine the result shares received from the compute nodes to generate a final result of the secure multiparty computation.

FIG. 3B is an example sequence diagram illustrating another example of a checkpoint and a resume in the context of a failure of a compute node. The operations of FIG. 3B are similar to those of FIG. 3A, and in this example, operations 306-316 are the same as those described above with respect to FIG. 3A. After the checkpoint at operation 314, compute node 304A experiences a failure that causes the termination of the secure multiparty computation. In this example, the failure may be such that compute node 304A may be able to function and may be able to receive messages, but due to the failure, does not process protocol messages such as protocol message C (320A) sent during the period of failure 319.

Compute node 304B may detect the failure in compute node 304A (323). In response to detecting the failure, compute node 304B sends a resume request to compute node 304A (325). At this time, compute node 304A has restarted or otherwise recovered from the failure. Compute node 304A may acknowledge the resume request (327). Compute node 304A and compute node B proceed with operations 328A, 328B and 330-336 as described above with respect to FIG. 3A.

FIG. 3C is an example sequence diagram illustrating an example of a checkpoint being requested by a request node 303. Request node 303 may be another compute node, an input node, a results node, or a node that controls aspects of the operation of the MPC network that includes compute nodes 304A and 304B (e.g., a dealer node). In the example illustrated in FIG. 3C, a secure multiparty computation may be initiated as described above in operations 306-312 of FIGS. 3A and 3B.

As some point during the multiparty computation, request node 303 issues a checkpoint request to compute node 304A (344). Similarly, request node 303 sends a checkpoint request to compute node 304B (346). The checkpoint requests can be considered checkpoint events. In response to the checkpoint requests, compute node 304A saves a copy of compute node 304A's current computation state as checkpoint data (348A). Similarly, compute node 304B saves a copy of compute node 304B's current computation state as checkpoint data (348B). In some aspects, the operations of compute node 304A and compute node 304B are suspended (350).

As an example, compute node 304A and compute node 304B may be using spare cycles of machines provided by a cloud service provider. These spare cycles may be provided by the cloud service provider at a reduced cost. The cloud service provider may desire to reclaim the machines in order to provide services to other customers that are paying a higher rate for the cycles. In this case, the cloud service provider may signal the nodes in the MPC network such as compute node 304A and compute node 304B that their service is about to be terminated. As an example, Amazon Elastic Compute Cloud (E2C) provides "spot instances" of computing resources that can be much less expensive than on-demand instances. E2C issues an "interruption notice" when it needs to reclaim resources or if the price of the resources exceeds a customer set threshold. In response to the interruption notice, the compute node can choose to hibernate, terminate, or stop the compute node. Google Cloud provides a service similar to E2C referred to as a "preemptible virtual machine (VM)." Google Cloud sends a "preemption notice" to a virtual machines when the virtual machine is to be preempted. In some implementations, request node 303 may send a checkpoint request to compute nodes 304A and 304B in response to receiving an interruption notice or preemption notice. In some implementations, compute nodes 304A and 304B may automatically checkpoint their respective current states of the multiparty computation in response to receiving a preemption notice or interruption notice. In some implementations, any compute node that receives an interruption notice or preemption notice may issue a checkpoint request to the other compute nodes in the MPC network.

Request node 303 can send a resume request to compute node 304A (352). Additionally, request node 303 can send a resume request to compute node 304B (354). In response to receiving the resume requests, compute node 304A and compute node B can begin a resume protocol, 356A and 356B respectively. As part of the resume protocol, compute node 304A restores the current computation state using compute node 304A's previously stored checkpoint data. Similarly, compute node 304B restores the current computation state using compute node 304B's previously stored checkpoint data. Compute node 304A and compute node 304B may continue with the multiparty computation. In some implementations, request node 303 may send a resume request to compute node 304A and compute node 304B in response to being resumed by a cloud service provider such as E2C or Google Cloud. In some implementations, compute node 304A and compute node 304B may begin their respective resume protocols in response to resume notifications received from a cloud service provider such as E2C or Google Cloud.

Compute node 304A and compute node 304B can continue the secure multiparty computation until each respective compute nodes generates a share of the result. Compute node 304A sends its result share A to result node 305 (360). Compute node 304B also sends its result share B to result node 305 (362). Result node 305 can combine the result shares received from the compute nodes to generate a final result of the secure multiparty computation.

Figure 4:
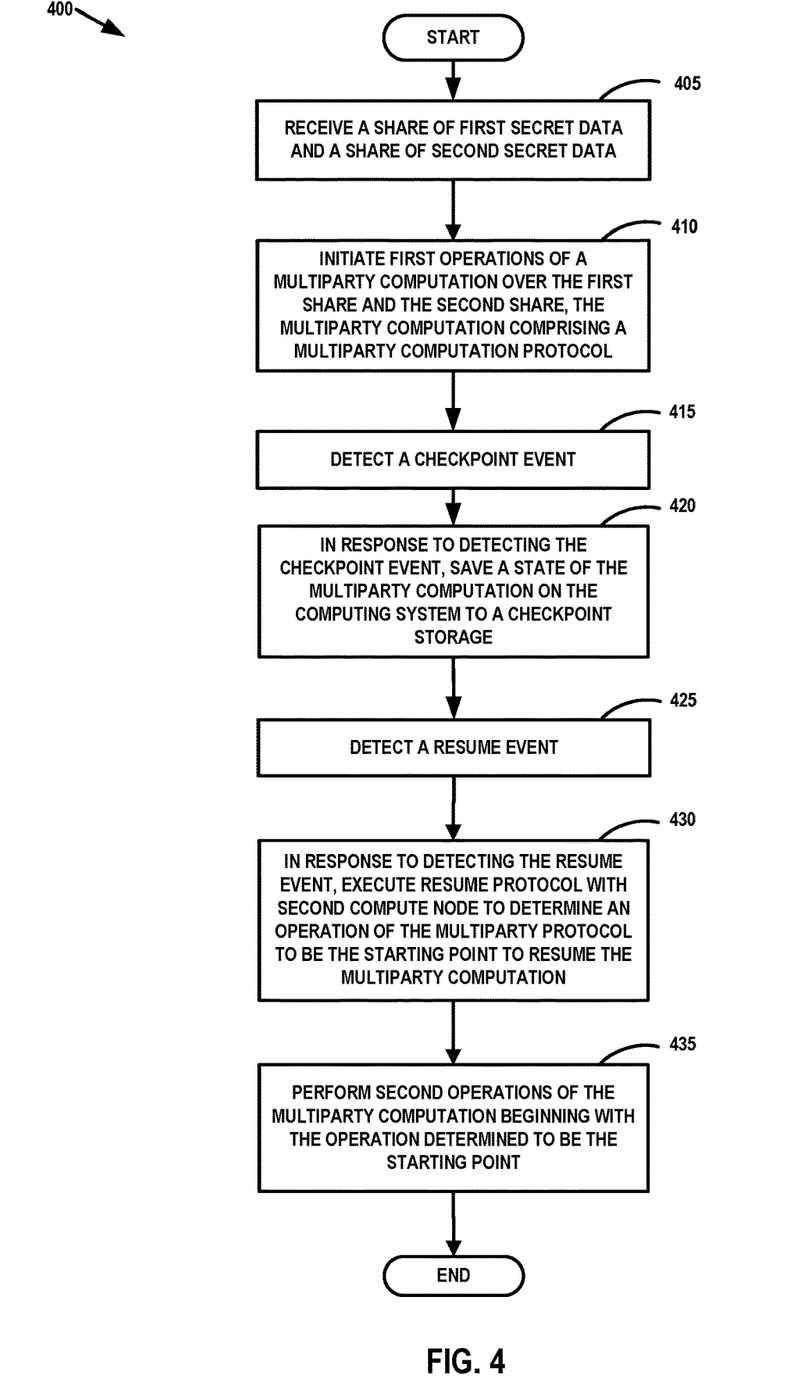
FIG. 4 is a flowchart illustrating example operations of a method for checkpointing a secure multiparty computation, in accordance with techniques of the disclosure.

FIG. 4 is a flowchart illustrating example operations of a method for checkpointing a secure multiparty computation, in accordance with techniques of the disclosure. A first compute node of an SMPC system may receive a share of first secret data and a share of second secret data (405). Next, the first compute node may perform a first set of operations of a multiparty computation over the first share and the second share, the multiparty computation comprising a multiparty computation protocol (410). Next, the first compute node may detect a checkpoint event (415). The first compute node may, in response to detecting the checkpoint event, save a state of the multiparty computation on the computing system to a checkpoint storage (420). Later, the first compute node may detect a resume event (425). In response to detecting the resume event, the first compute node may execute a resume protocol with a second compute node (430). The resume protocol may include the first compute node and the second compute node exchanging messages as part of a negotiation to determine an operation of the multiparty computation to be the starting point to resume the computation. The first compute node can begin a second set of operations beginning with the operation determined as the starting point (435).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method of multiparty computation, comprising:
receiving, by a first computing system having one or more processors, a share of first secret data and a share of second secret data;
performing, by the first computing system, first operations of a multiparty computation over the share of first secret data and the share of second secret data, the multiparty computation comprising a multiparty computation protocol;
detecting, by the first computing system, a checkpoint event;
in response to detecting the checkpoint event, saving a state of the multiparty computation on the first computing system to one or more checkpoint data storage systems;
detecting, by the first computing system, a resume event;
in response to detecting the resume event, executing a resume protocol with a second computing system of the multiparty computation, the resume protocol comprising instructions to exchange one or more messages with the second computing system, and determine, based on the one or more messages, an operation in the multiparty computation to be a starting point to resume the multiparty computation; and
performing, by the first computing system using the state of the multiparty computation saved to the one or more checkpoint data storage systems, second operations of the multiparty computation to continue the multiparty computation, the second operations beginning with the determined operation.

2. The method of claim 1, wherein saving the state of the multiparty computation comprises saving at least one of one or more (i) multiparty computation protocol messages received prior to the checkpoint event or (ii) message digests received prior to the checkpoint event.

3. The method of claim 1, wherein detecting the checkpoint event comprises executing a checkpoint step of the multiparty computation protocol.

4. The method of claim 1, wherein detecting the checkpoint event comprises receiving a checkpoint request message.

5. The method of claim 1, wherein detecting the checkpoint event comprises receiving an interruption notice from a cloud service provider providing compute resources for the first computing system.

6. The method of claim 1, further comprising:
in response to detecting the checkpoint event, executing, by the first computing system, a checkpoint protocol with one or more of a plurality of computing systems, the plurality of computing systems including the first computing system and the second computing system.

7. The method of claim 1, wherein the checkpoint event comprises:
verifying, by each computing system of the first and second computing systems, an integrity of the corresponding multiparty computation performed by the respective computing system;
wherein saving the state of the multiparty computation on the first computing system is in response to determining that each computing system of first and second computing systems successfully verified the integrity of the corresponding multiparty computation performed by the respective computing system.

8. The method of claim 1, wherein detecting the resume event comprises receiving, by the first computing system, a request to resume from a second computing system.

9. The method of claim 1, wherein detecting the resume event comprises detecting that the second computing system has been restarted or resumed.

10. The method of claim 1, wherein detecting the resume event comprises detecting that the second computing system executing the multiparty computation has failed.

11. A first compute node comprising:
one or more processors; and
a memory coupled to the one or more processors and storing instructions, that when executed, cause the one or more processors to:
receive a share of first secret data and a share of second secret data;
perform first operations of a multiparty computation over the share of first secret data and the share of second secret data, the multiparty computation comprising a multiparty computation protocol;
detect a checkpoint event;
in response to detection of the checkpoint event, save a state of the multiparty computation on the first compute node to one or more checkpoint data storage systems;
detect a resume event;
in response to detection of the resume event, execute a resume protocol with a second compute node of the multiparty computation, the resume protocol comprising instructions to exchange one or more messages with the second compute node, and determine, based on the one or more messages, an operation in the multiparty computation to be a starting point to resume the multiparty computation; and
perform, using the state of the multiparty computation saved to the checkpoint storage, second operations of the multiparty computation to continue the multiparty computation, the second operations beginning with the determined operation.

12. The first compute node of claim 11, wherein the instructions to save the state of the multiparty computation comprise instructions to save one or more (i) multiparty computation protocol messages received prior to the checkpoint event or (ii) message digests received prior to the checkpoint event.

13. The first compute node of claim 11, wherein the instructions to detect the checkpoint event comprise one or more of:
instructions to execute a checkpoint step of the multiparty computation protocol;
instructions to receive a checkpoint request message; and
instructions to receive an interruption notice from a cloud service provider providing compute resources for the first compute node.

14. The first compute node of claim 11, further comprising:
in response to detection of the checkpoint event, execute a checkpoint protocol with one or more of a plurality of compute nodes, the plurality of compute nodes including the first compute node and the second compute node.

15. The first compute node of claim 14, wherein the checkpoint protocol comprises instructions to:
verify an integrity of the multiparty computation;

wherein the instructions to save the state of the multiparty computation comprise instructions to save the state of the multiparty computation in response to a determination that each compute node of the plurality of compute nodes including the first compute node and the second compute node successfully verified the integrity of the corresponding multiparty computation of the respective compute node.

16. The first compute node of claim 11, wherein the instructions to detect the resume event comprise one or more of:
   instructions to receive a request to resume from the second compute node;
   instructions to detect that the second compute node has been restarted or resumed; and
   instructions to detect that the second computing system executing the multiparty computation has failed.

17. A system comprising:
   a first compute node and a second compute node, each of the first compute node and the second compute node comprising processing circuitry configured to execute a multiparty computation, wherein the multiparty computation comprises a multiparty computation protocol; and
   a network communicatively coupling the first compute node and the second compute node;
   wherein the first compute node is configured to:
      receive a share of first secret data and a share of second secret data;
      perform first operations of the multiparty computation over the share of first secret data and the share of second secret data;
      detect a checkpoint event;
      in response to detection of the checkpoint event, save a state of the multiparty computation on the first compute node to one or more checkpoint data storage systems;
      detect a resume event;
      in response to detection of the resume event, execute a resume protocol with the second compute node, the resume protocol comprising instructions to exchange one or more messages with the second compute node, and determine, based on the one or more messages, an operation in the multiparty computation to be a starting point to resume the multiparty computation; and
      perform, using the state of the multiparty computation saved to the one or more checkpoint data storage systems, second operations of the multiparty computation to continue the multiparty computation, the second operations beginning with the determined operation.

18. The system of claim 17, wherein the first compute node is further configured to save one or more (i) multiparty computation protocol messages received prior to the checkpoint event or (ii) message digests received prior to the checkpoint event.

19. The system of claim 17, wherein the first compute node is further configured to:
   in response to detection of the checkpoint event, execute a checkpoint protocol with one or more of a plurality of compute nodes, the plurality of compute nodes including the first compute node and the second compute node.

20. The system of claim 17, wherein the first compute node is further configured to:
   verify an integrity of the multiparty computation;
   wherein to save the state of the multiparty computation is in response to a determination that each compute node of a plurality of compute nodes including the first compute node and the second compute node successfully verified the integrity of the corresponding multiparty computation of the respective compute node.

* * * * *